(12) United States Patent
Lin

(10) Patent No.: US 6,554,289 B1
(45) Date of Patent: Apr. 29, 2003

(54) ANTI-SLIP TYPE ELECTRIC DRILL CHUCK

(75) Inventor: Yuan-Ho Lin, Ta Li (TW)

(73) Assignee: Chum Power Machinery Corp., Taichung Hsien (TW)

( * ) Notice: Subject to any disclaimer, the term of this patent is extended or adjusted under 35 U.S.C. 154(b) by 47 days.

(21) Appl. No.: 09/974,527

(22) Filed: Oct. 11, 2001

(51) Int. Cl.⁷ .............................................. B23B 31/16
(52) U.S. Cl. ......................... 279/62; 279/140; 279/902
(58) Field of Search ............................. 279/60–62, 140, 279/902

(56) References Cited

U.S. PATENT DOCUMENTS

| | | | | |
|---|---|---|---|---|
| 5,458,345 A | * | 10/1995 | Amyot | 279/62 |
| 5,669,616 A | * | 9/1997 | Ho | 279/62 |
| 5,816,582 A | * | 10/1998 | Steadings et al. | 279/62 |
| 6,182,978 B1 | * | 2/2001 | Hsueh | 279/62 |
| 6,260,856 B1 | * | 7/2001 | Temple-Wilson | 279/62 |
| 6,341,783 B1 | * | 1/2002 | Rohm | 279/62 |
| 6,390,481 B1 | * | 5/2002 | Nakamuro | 279/62 |

* cited by examiner

Primary Examiner—Steven C Bishop
(74) Attorney, Agent, or Firm—Charles E. Baxley

(57) ABSTRACT

An anti-slip type electric drill chuck mainly includes a body which is obliquely provided with three pawls for clamping a drill head. The outer surface of one end of the three pawls is provided with a threaded surface for engaging a tapered threaded hole in a bearing nut, which has an outer end with teeth, an end portion provided with a ball ring. A check nut protective sleeve encloses the ball ring and bearing nut, and has elastic pointed portions engage the teeth. A drive annular block engages the inner wall of the bearing nut. A front housing sleeve engages the drive annular block and surrounds the aforesaid components. The front housing sleeve is rotated by hand to advance or retract the pawls to thereby loosen or tighten drill head. When the pawls clamp the drill head, the check nut protective sleeve stabilizes the bearing nut to prevent slippage thereof.

17 Claims, 9 Drawing Sheets

ANTI-SLIP TYPE ELECTRIC DRILL CHUCK

BACKGROUND OF THE INVENTION (a) Field of the Invention

The invention relates to a chuck of an electric drilling tool, more particular to an anti-slip type electric drill chuck.

(b) Description of the Prior Art

A conventional electric drill chuck structure generally has a body connected to a rotary shaft of a motor. The motor is externally provided with an adjusting housing for local rotation. The body has a plurality of slanting pawls annularly disposed thereon. The user can adjust the adjusting housing with his/her hand to control the advancement or retraction of the pawls in an oblique direction to thereby clamp or release a drill head.

Such a mechanism of using the hand to manipulate of the adjusting housing so as to control advancement or retraction of the pawls may, due to factors such as vibration of the drill head, torque, resistance on drill surface, etc. during the drilling operation, cause the engagement between the pawls and the drill head to become loosened so that it is necessary to stop the machine and lock the drill head again. Otherwise, the drill head will deviate and is likely to be damaged. The drill surface is also likely to be damaged.

SUMMARY OF THE INVENTION

The primary object of the invention is to provide an anti-slip type electric drill chuck, in which a front housing sleeve of a chuck unit is rotated by hand to control the chuck unit to clamp or release a tool such as drill head. When the chuck unit clamps the tool during operation, the chuck can prevent slippage of the drill head due to counteractions of vibration, torque, resistance, etc., resulting from the drilling operation.

In order to achieve the abovementioned object, an anti-slip type electric drill chuck of the present invention mainly includes a body which is obliquely provided with three pawls for clamping a drill head. The outer surface of one end of the three pawls is provided with a threaded surface for engaging a tapered threaded hole in a bearing nut, which has an outer end with teeth, an end portion provided with a ball ring. A check nut protective sleeve encloses the ball ring and bearing nut, and has elastic pointed portions engage the teeth. A drive annular block engages the inner wall of the bearing nut. A front housing sleeve engages the drive annular block and surrounds the aforesaid components.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
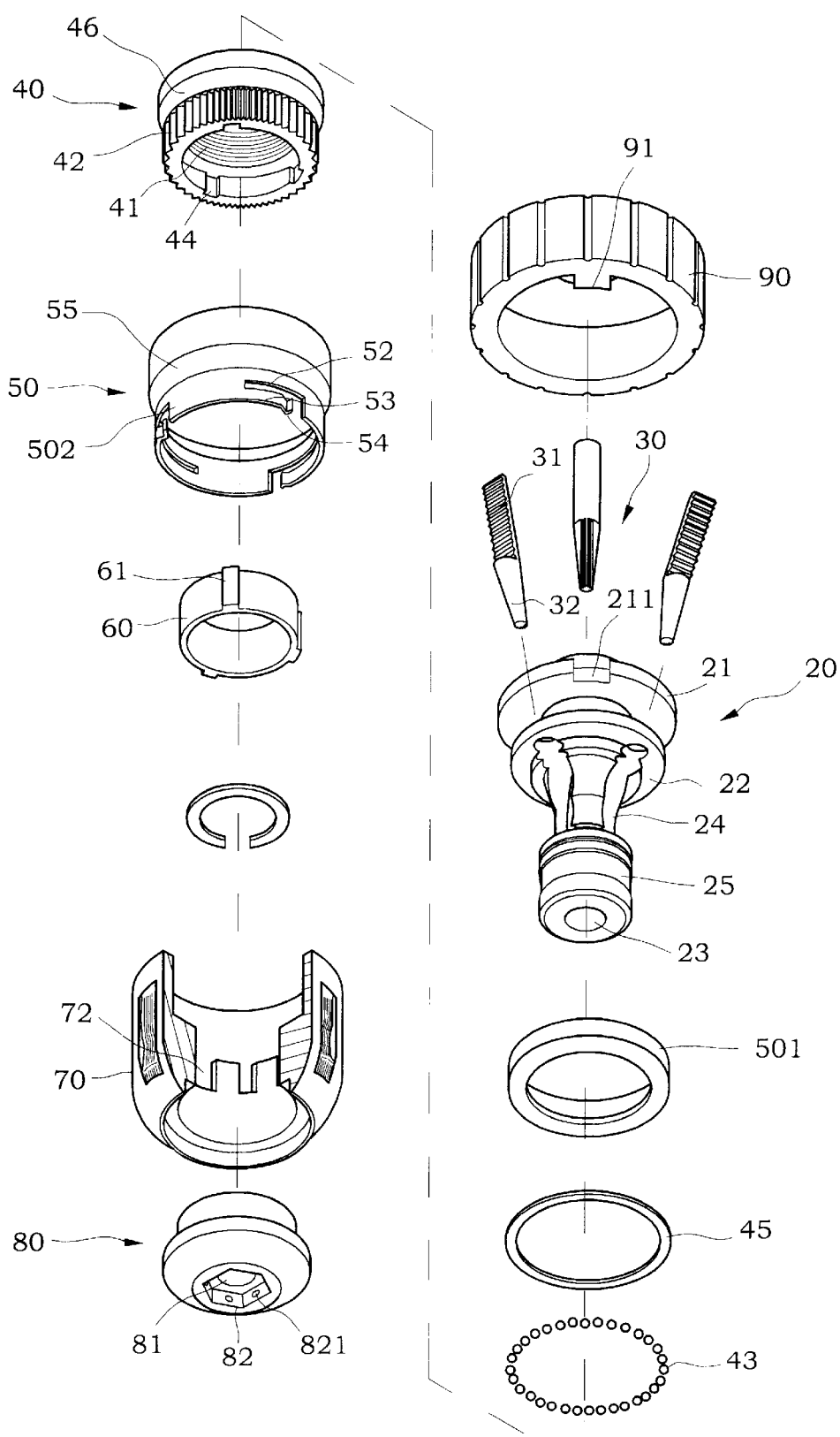
FIG. 1 is an exploded perspective view of the present invention.

Referring to FIGS. 1, 2, 3 and 4, the chuck according to the present invention includes a body 20, a bearing nut 40, a check nut protective sleeve 50, a drive annular block 60, a front housing sleeve 70, a tool sleeve 80, and a rear housing sleeve 90.

The body 20 has one end connected to a transmission shaft of an electric rill motor. The body 20 is provided with a first ring 21 and a second ring 22 projecting from the outer periphery of a shaft securing end thereof. The center of the body 20 is provided with a shaft hole 23. The periphery of the seat body is formed with three equidistantly spaced guide grooves 24. One end of the three guide grooves 24 passes through the second ring 22. The other end extends into the shaft hole 23. Three pawls 30 respectively extend into the guide grooves 24 from exposed holes formed by the three guide grooves 24 in the second ring 22. The pawl 30 has a threaded surface 31 exposed from the body 20, and has an inner end portion extending into the shaft hole 23 to form a clamping end 32 for clamping a tool such as a drill head, reamer, screwdriver, tapping cutter, etc.

The bearing nut 40 is sleeved on the body 20, and is centrally provided with a tapered threaded hole 41 for engaging the threaded surface 31 of the pawl 30. The outer periphery of the bearing nut 40 has a surface with different diameters, with a juncture forming an oblique wedged surface 46. The surface with the smaller diameter is provided with teeth 42. The end portion of the bearing nut 40 that corresponds to the second ring 22 of the body 20 is fitted with a ball ring 43 and a heat-treated washer 45.

The check nut protective sleeve 50 includes a tooth fitting ring 502 and a packing ring 501. The tooth fitting ring 502 is in the form of an annular sleeve fitted on the bearing nut 40 and has a ring end provided with a plurality of bent openings 52 corresponding to the teeth 42 of the bearing nut 40 such that one side of the respective opening 52 forms an elastic piece 53. An open end portion of the elastic piece 53 is recessed toward the center of the tooth fitting ring 502 so as to form a pointed portion 54. The pointed portion 54 can engage the teeth 42. The packing ring 501 is disposed at the ball ring 43 and washer 45 of the bearing nut 40 to urge against the end of the tooth fitting ring 502. Corresponding to the wedged surface 46 of the bearing nut 40, the tooth fitting ring 502 is also formed with an oblique wedged surface 55. The two wedged surfaces 46, 55 abut against each other to be thereby positioned so as to further prevent loosening or slippage of the tooth fitting ring 502. The check nut protective sleeve 50 encloses the bearing nut 40 and ball ring 43 as an assembly disposed on the body 20 such that the exterior of the packing ring 501 surrounds the second ring 22.

The drive annular block 60 has one end fitted in the end edge of the bearing nut 40. The outer edge of the drive annular block 60 is provided with a plurality of protrusions 61. The inner periphery of the end portion of the bearing nut 40 is provided with a plurality of recesses 44 for retaining the protrusions 61. The other end portion of the drive annular block 60 is exposed from the body 20.

The front housing sleeve 70 is a hollow sleeve with two open ends, and is fitted at the end portion of the body 20 to enclose the drive annular block 60, check nut protective sleeve 50 and bearing nut 40. The inner periphery of the front housing sleeve 70 is annularly provided with a plurality of recesses 72 for retaining protrusions 61 of the drive annular block 60 such that when the front housing sleeve 70 is turned by hand, the bearing nut 40 can be brought to rotate therewith.

The tool sleeve 80 is tightly fitted at the end portion of the body 20 to limit the front housing sleeve 70. The center thereof is provided with an extension hole 81 for extension of a tool, such as drill head 100, therethrough. The outer edge thereof is provided with a polygonal hole 82 into which a workpiece, such as a sleeve, can be fitted directly. The inner edge of the hole is provided with a semi-curved groove 821 such that a securing ball of the sleeve can be insertably retained therein to thereby position the sleeve. The inner edge of the tool sleeve 80 is annularly provided with an abutting protrusion 83 for tightly abutting against an abutting groove 25 at the end portion of the body 20 so that the tool sleeve 80 will not become disengaged.

The rear housing sleeve 90 is a sleeve member with a substantially U-shaped cross-section, and is fitted on the first ring 21 of the shaft securing end of body 20. The rear housing sleeve 90 is internally provided with a projecting retaining portion 91. The first ring 21 is provided with a groove 211 for retaining the retaining portion 91.

Figure 2:
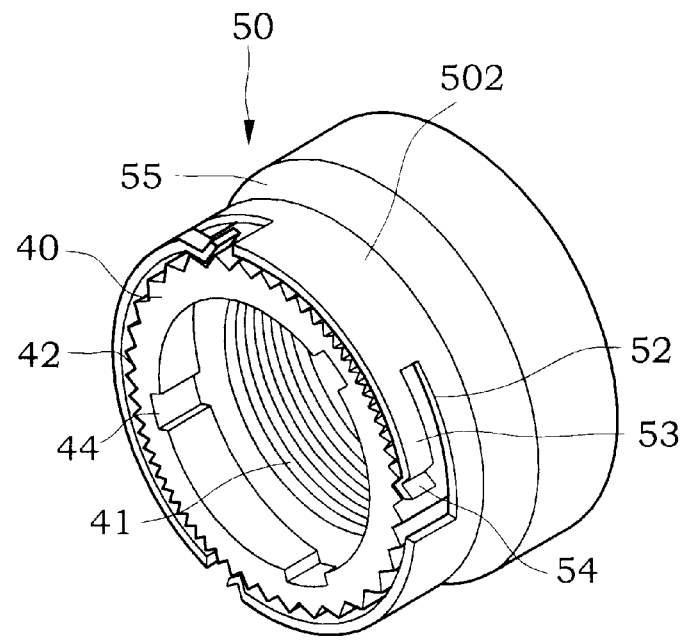
FIG. 2 is an elevation view of the check nut protective sleeve of the invention and the relevant construction in assembly.
Figure 3:
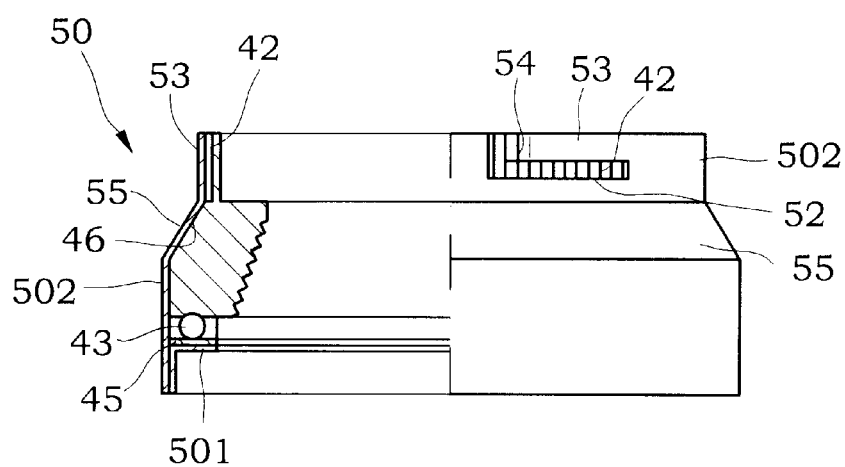
FIG. 3 is a sectional view of the check nut protective sleeve of the invention and the relevant construction in assembly.
Figure 4:
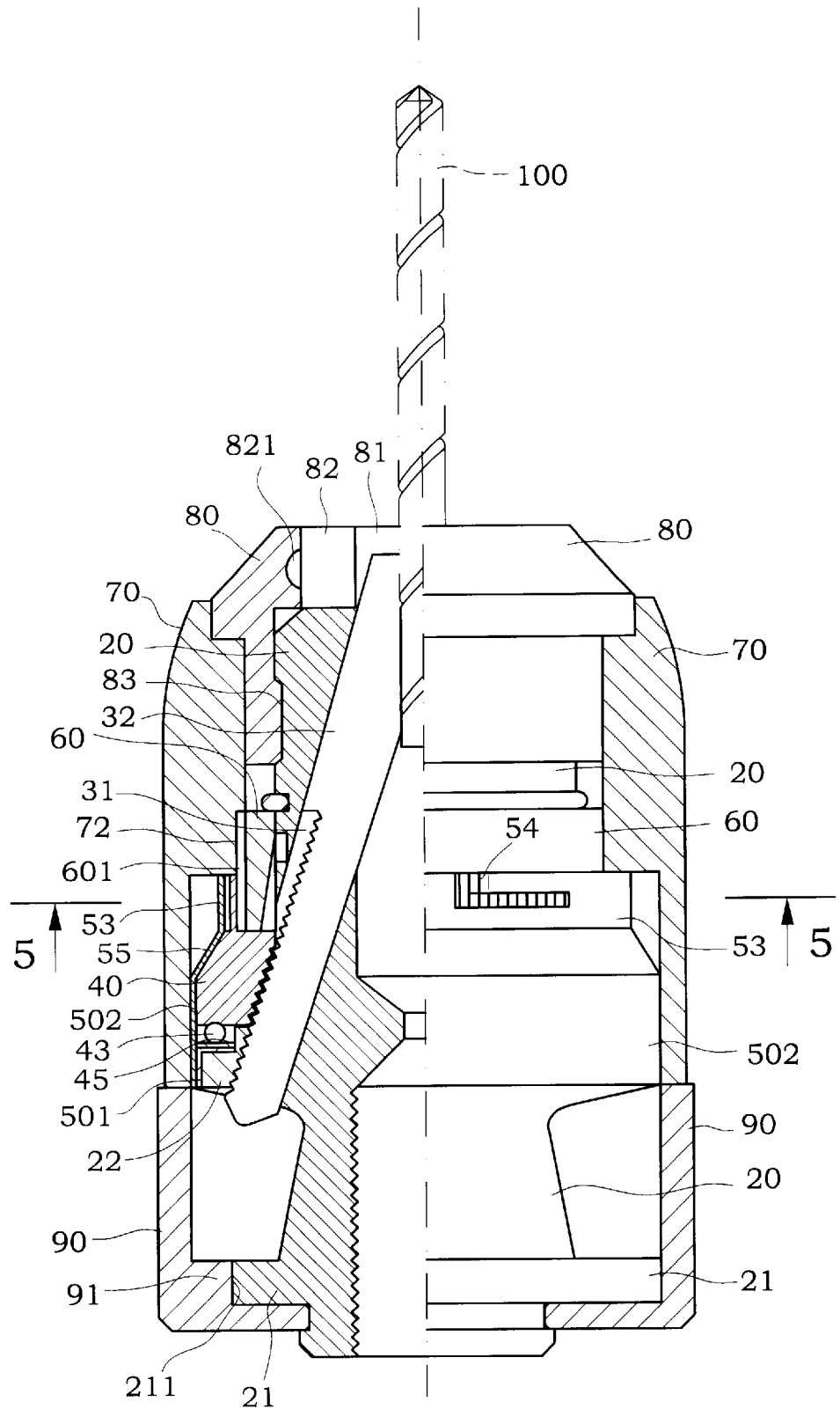
FIG. 4 is a sectional view of the present invention in assembly.

The operation of the present invention will be described hereinafter with reference to FIGS. 2 and 5A.

If it is desired to lock the drill head 100 tight, the end portion of the drill head 100 is inserted into the extension hole 81 in the tool sleeve 80 and further into the shaft hole 23 in the body 20. The front housing sleeve 70 is rotated by hand to drive the drive annular block 60, bearing nut 40 and check nut protective sleeve 50 to rotate. At the same time, by means of the tapered threaded hole 41 in bearing nut 40, the pawls 30 are caused to displace in the direction of the drill head 100.

When the clamping ends 32 of the pawls 30 engage the drill head 100, the ball ring 43 and washer 45 at the end portion of bearing nut 40 will be tightly pressing against the packing ring 501 of check nut protective sleeve 50. At this time, the pressed check nut protective sleeve 50 will not be able to rotate with bearing nut 40. If the operator turns the front housing sleeve 70 very slightly, the teeth 42 on bearing nut 40 will push away the pointed portion 54 of the elastic piece 53 of check nut protective sleeve 50 (as shown in FIG. 5B), and a clicking sound of engagement between teeth will be heard. The user can then judge that the front housing sleeve 70 and bearing nut 40 have been rotated to a critical limit and can therefore stop turning the front housing sleeve 70. The pointed portion 54 of check nut protective sleeve 50 is still retained in teeth 42 of bearing nut 40 (as shown in FIG. 5C).

It is noted that when the drill head 100 is performing a drilling operation, vibration, torque, resistance, etc., will occur. However, since the pointed portion 54 of check nut protective sleeve 50 of the present invention engages the teeth 42 of bearing nut 40, and since the ball ring 43 causes the packing ring 501 of check nut protective sleeve 50 to press tightly against the second ring 22 of body 20 so that when check nut protective sleeve 50 rotates with the body 20, there is a limiting relationship with respect to the bearing nut 40 to keep the tapered threaded hole 41 of bearing nut 40 engaging the pawls 30 firmly, disengagement of drill head due to vibration, torque or resistance will not occur, and the drill head 100 can perform the drilling operation stably.

When it is desired to remove the drill head 100, the front housing sleeve 70 is rotated in a reverse direction. After turning the same very slightly, since the check nut protective sleeve 50 is still pressed by the ball ring 43 and washer 45, there is still the clicking sound due to friction between the teeth when the bearing nut 40 is turned. But when the bearing nut 40 starts driving the pawls 30 to retract, the ball ring 43 and washer 45 will release the pressure on the packing ring 501 of check nut protective sleeve 50 and return to the state wherein the two are loosely engaged. At this time, since the check nut protective sleeve 50 has the pointed portion 54 thereof engaging the teeth 42, it can rotate with the bearing nut 40 until the pawls 30 are completely retracted from the drill head 100.

In the tool sleeve 80 shown in FIGS. 1 to 5C, the polygonal hole 82 is adapted to receive workpieces, such as sleeves.

Figure 5A:
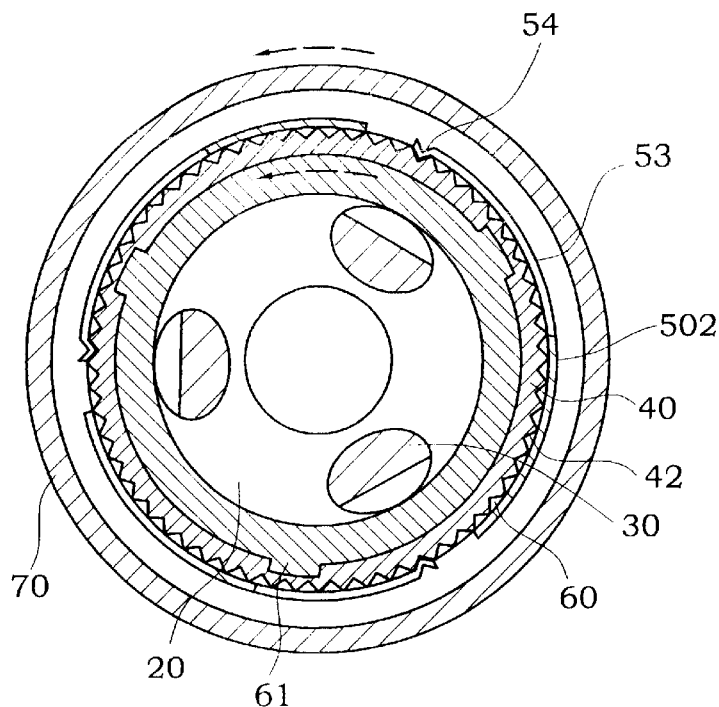
FIG. 5A is a sectional view taken along line 5—5 of FIG. 4, showing the operation of the invention in the arrow indicated.
Figure 5B:
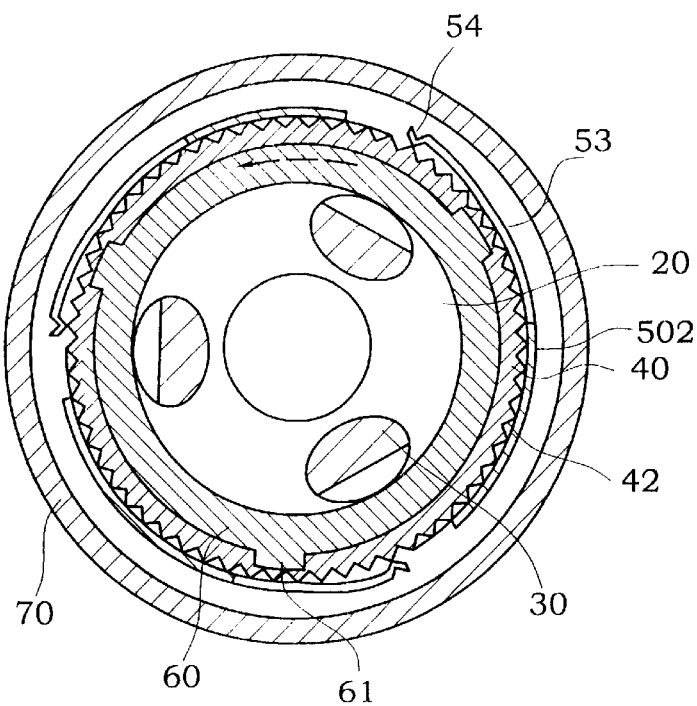
FIG. 5B is a sectional view taken along line 5—5 of FIG. 4, showing the operation of the invention in the arrow indicated.
Figure 5C:
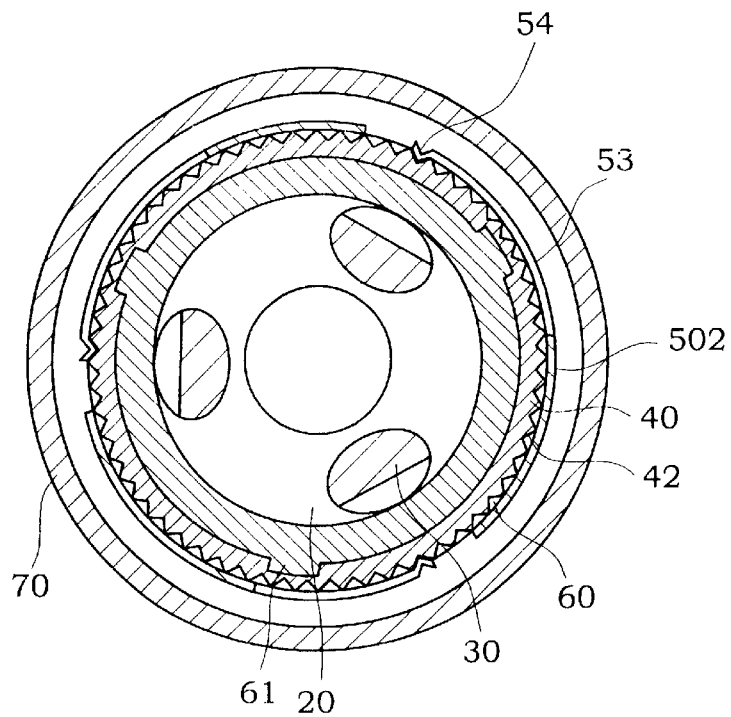
FIG. 5C is a sectional view taken along line 5—5 of FIG. 4, showing the operation of the invention in the arrow indicated.
Figure 6:
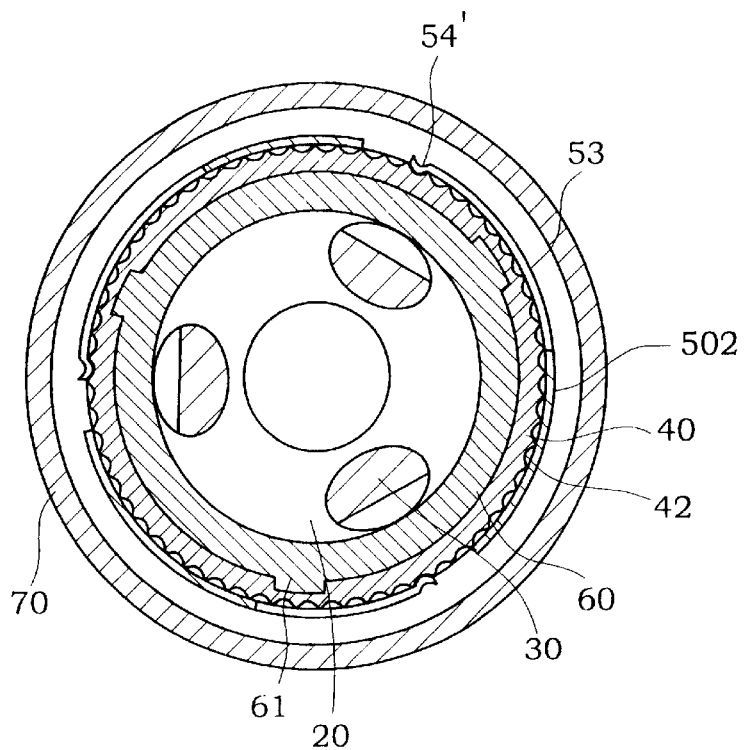
FIG. 6 is a cross-sectional view in the same direction of FIG. 5C, showing the second embodiment of the invention.

As shown in FIGS. 5A to 5C, in the first embodiment, the root bottom portion between adjacent teeth 42 of bearing nut 40 is in a pointed shape; therefore, the pointed portion 54 of tooth fitting ring 502 is also in a pointed shape. In the second embodiment shown in FIG. 6, the root bottom portion between adjacent teeth 42 of bearing nut 40 is curved; therefore, the pointed portion 54' of tooth fitting ring 502 is also in a curved shape so as to be engageable therewith.

Figure 7:
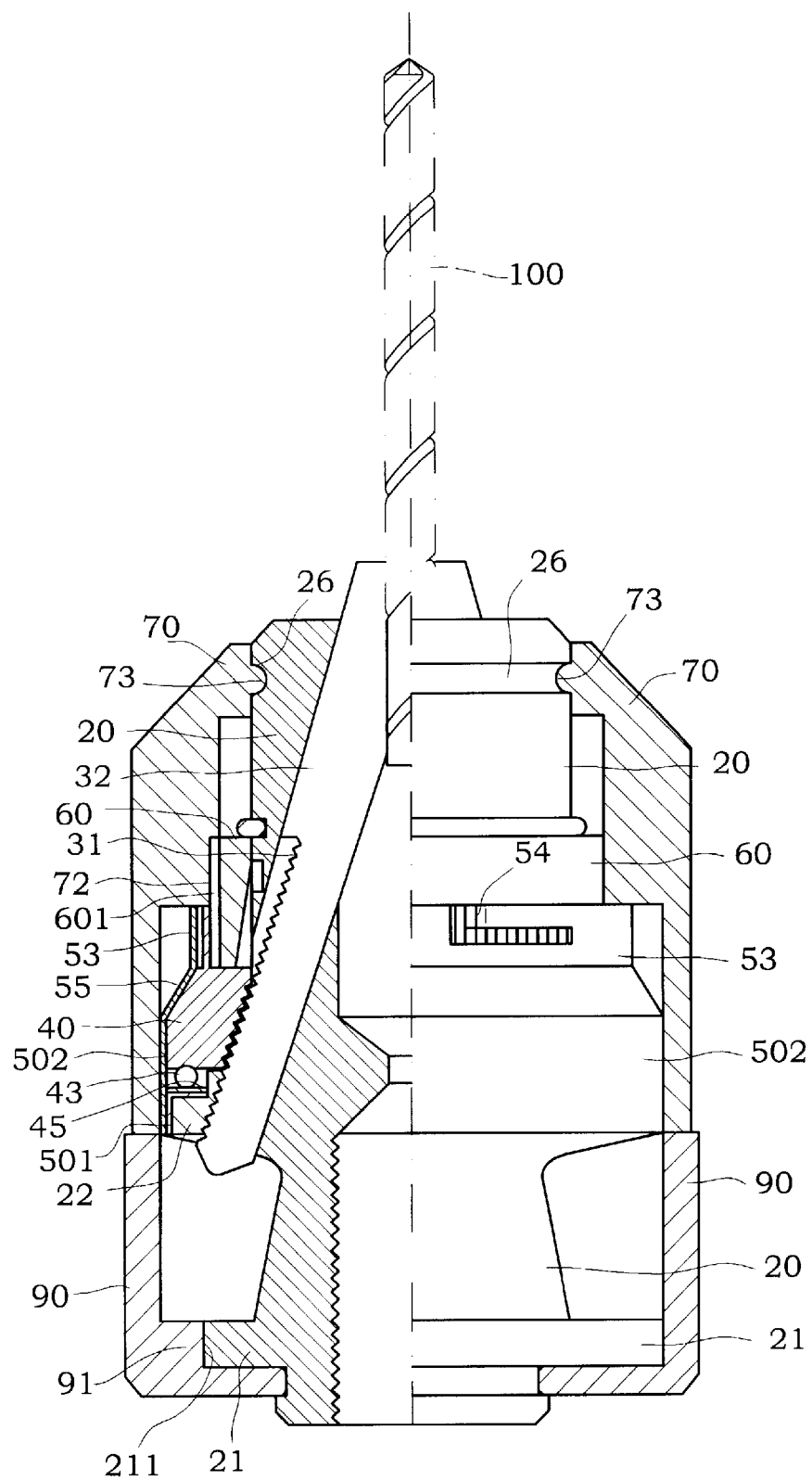
FIG. 7 is a sectional view of the third embodiment of the invention.

Referring to FIG. 7, the third embodiment of this invention does not include a tool sleeve 80, and a recess 26 is formed at the head end of body 20. The front housing sleeve 70 is provided with a projecting block 73 for insertion into the recess 26 to thereby position the front housing sleeve 70 and the body 20.

Figure 8:
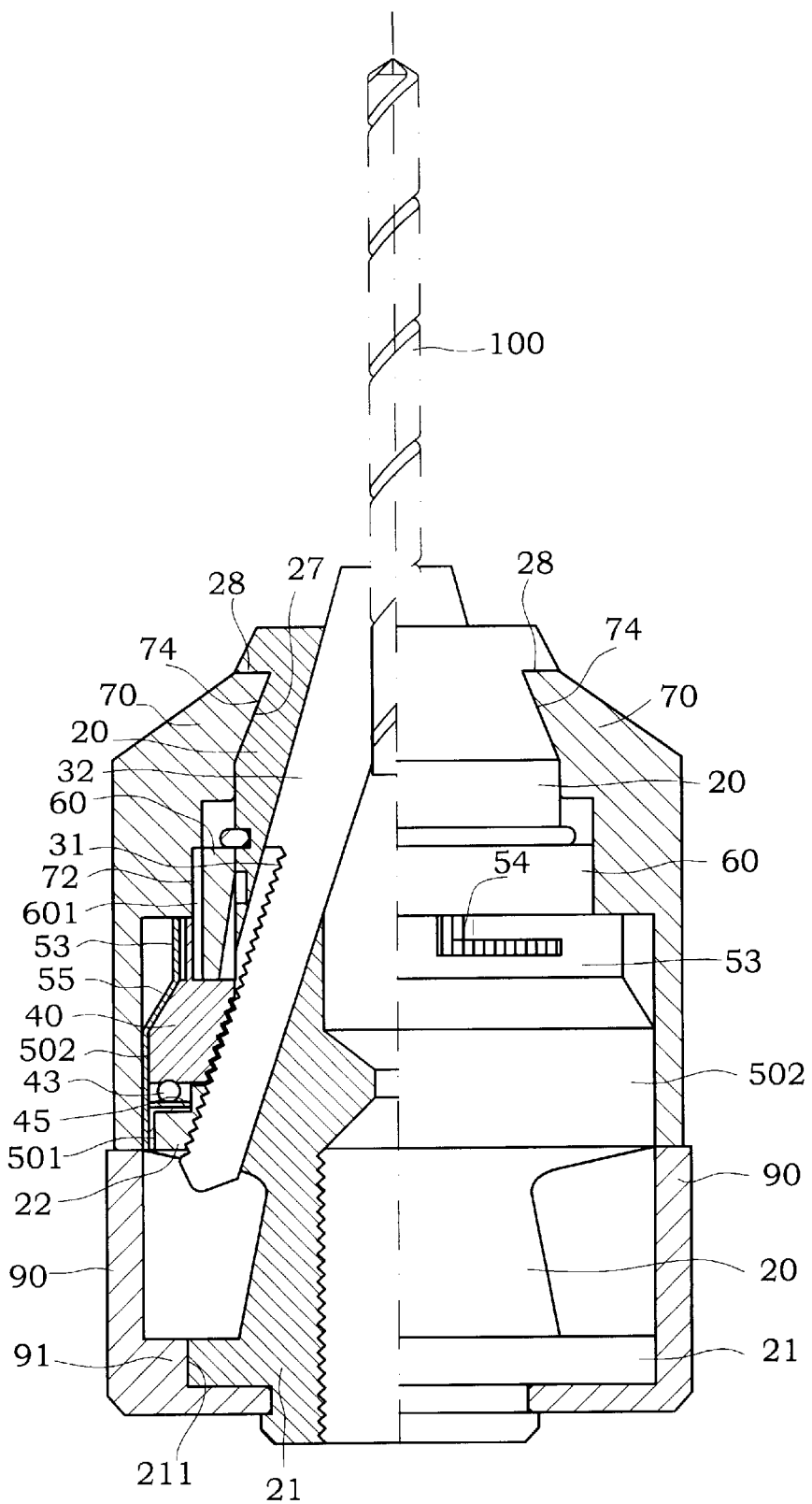
FIG. 8 is a sectional view of the fourth embodiment of the invention.

Referring to FIG. 8, which shows the fourth embodiment of this invention, the head end of the body 20 is provided with a taper portion 27 that tapers toward the open end. The open end of the body 20 is provided with an inverted-angle stop portion 28. The inner edge of the front housing sleeve 70 near the open end thereof is provided with a taper surface that matches and engages the taper portion 27, with the stop portion 28 of the body 20 stopping the open end of the front housing sleeve 70 to thereby position the front housing sleeve 70 and the body 20.

Figure 9:
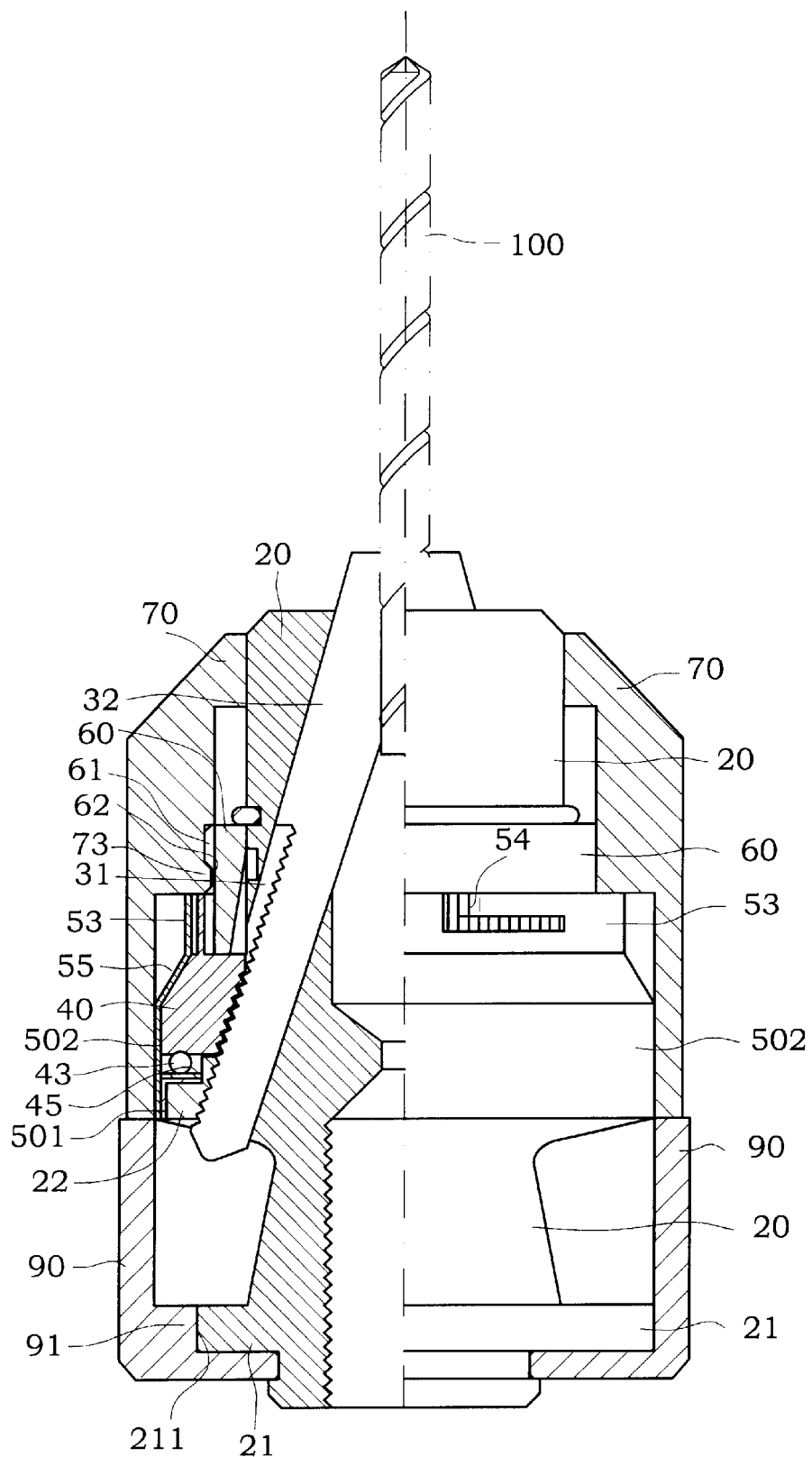
FIG. 9 is a sectional view of the fifth embodiment of the invention.
Figure 10:
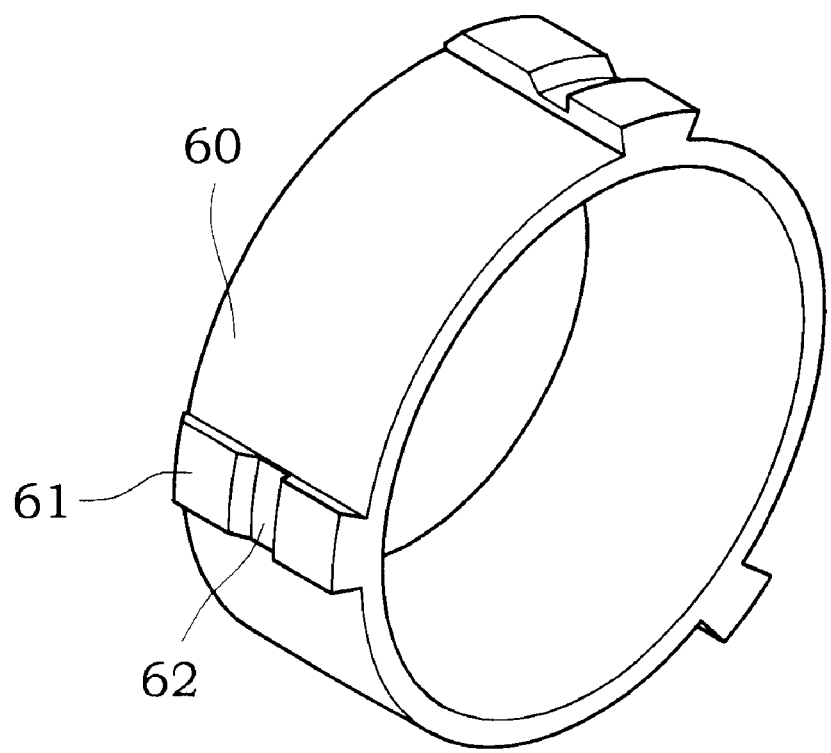
FIG. 10 is a perspective view of the drive annular block of the fifth embodiment of the invention.

Referring to FIGS. 9 and 10, which show the fifth embodiment of this invention, the protrusion 61 of the drive annular block 60 is provided with a retaining groove 62. The groove 72 of the front housing sleeve 70 is provided with a retaining block 73 corresponding to the retaining groove 62 for engaging the retaining groove 62 so as to position the front housing sleeve 70 on the rive annular block 60 with no likelihood of slippage.

What is claimed is:

1. An anti-slip type electric drill chuck, comprising:
   a body having one end connected to a transmission shaft of an electric drill motor, said body being provided with a first ring and a second ring projecting from an outer periphery of a shaft securing end thereof, the other end of said body being provided with a shaft hole, the surface being provided with angularly arranged guide grooves for intersecting said shaft hole;

a plurality of pawls that are slidable in each of said guide grooves, the outer side of each of said pawls forming a threaded surface;

a bearing nut, the center of which is provided with a tapered threaded hole for locking said threaded surface of said pawl, the outer periphery of one end thereof being provided with teeth;

a ball ring provided at the other end of said bearing nut;

a washer provided between said ball ring and said second ring of said body;

a check nut protective sleeve fitted around said bearing nut and having one end provided with a plurality of elastically movable pointed portions to correspond to said teeth of said bearing nut for insertion thereinto, the other end thereof being provided with a packing ring for stopping said washer so as to enclose said bearing nut, said ball ring and said washer as a unit, said being nut being locked on said threaded surface of said pawl, said packing ring being provided at said second ring of said body;

a drive annular block extending outwardly of said body and having one end portion secured in an open end edge of said bearing nut, with the other end portion thereof exposed from said body;

a front housing sleeve positioned at said end portion of said body to enclose said drive annular block, said check nut protective sleeve and said bearing nut, and rotatable with the end portion of said drive annular block that is exposed from said body so as to be positioned;

a rear housing sleeve which is a substantially U-shaped hollow housing sleeve fitted on said first ring of said body.

2. The anti-slip type electric drill chuck as claimed in claim 1, wherein said outer edge of said bearing nut is an edge surface having different diameters with a juncture forming an oblique wedged surface, said check nut protective sleeve being provided with an oblique wedged surface corresponding to said oblique wedged surface of said bearing nut such that said wedged surfaces abut against each other to further prevent slippage of a tooth fitting ring.

3. The anti-slip type electric drill chuck as claimed in claim 1, wherein said washer has undergone heat treatment.

4. The anti-slip type electric drill chuck as claimed in claim 1, wherein the root bottom portion between adjacent teeth of said bearing nut is in a pointed shape, and said pointed portion of said check nut protective sleeve is also in a pointed shape.

5. The anti-slip type electric drill chuck as claimed in claim 1, wherein the root bottom portion between adjacent teeth of said bearing nut is in a curved shape, and said pointed portion of said check nut protective sleeve is also in a curved shape.

6. The anti-slip type electric drill chuck as claimed in claim 1, wherein said check nut protective sleeve includes a tooth fitting ring and a packing ring, said packing ring being fitted on said bearing nut and provided with elastically movable pointed portions to engage said teeth of said bearing nut, said tooth fitting ring having one end abutting tightly against said packing ring.

7. The anti-slip type electric drill chuck as claimed in claim 6, wherein said check nut protective sleeve is provided with a plurality of bent openings to correspond to toothed end portions of said bearing nut, one side of each of said bent openings forming an elastic piece with an open end portion that is recessed toward the center of said check nut protective sleeve so as to form a pointed portion.

8. The anti-slip type electric drill chuck as claimed in claim 1, wherein said drive annular block has an outer edge provided with a plurality of protrusions, said bearing nut having a plurality of recesses provided at the inner periphery of said end portion thereof for receiving said protrusions such that said drive annular block and said bearing nut have a rotatable limiting relationship.

9. The anti-slip type electric drill chuck as claimed in claim 1, wherein the inner periphery of said front housing sleeve is annularly provided with a plurality of recesses for retaining said protrusions of said drive annular block.

10. The anti-slip type electric drill chuck as claimed in claim 9, wherein said protrusions of said drive annular block are respectively provided with a retaining groove, said recesses of said front housing sleeve being respectively provided with a retaining block for engaging said retaining groove.

11. The anti-slip type electric drill chuck as claimed in claim 1, wherein said head end of said body is provided with at least one recess, said front housing sleeve being provided with a projecting block for insertion said recess.

12. The anti-slip type electric drill chuck as claimed in claim 1, wherein said head end of said body is provided with a taper portion that tapers toward the open end, the open end of said taper portion being a diameter-enlarged inverted-angle stop portion, the inner edge of said front housing sleeve near open end being provided with a taper surface matching said taper portion such that said taper surface engages said taper portion of said body, with said stop portion of said body stopping said open end of said front housing sleeve.

13. The anti-slip type electric drill chuck as claimed in claim 1, further comprising a tool sleeve which is tightly fitted on said end portion of said body to limit said front housing sleeve, and which is centrally provided with an extension hole for extension of a tool such as drill head therethrough for clamping by said pawls.

14. The anti-slip type electric drill chuck as claimed in claim 13, wherein the outer end of said tool sleeve is provided with a polygonal hole for fitting a workpiece such as a sleeve directly.

15. The anti-slip type electric drill chuck as claimed in claim 14, wherein the inner edge of said polygonal hole of said tool sleeve is provided with a semi-curved groove for insertion of a securing ball of a sleeve tool to thereby position said sleeve.

16. The anti-slip type electric drill chuck as claimed in claim 15, wherein the inner edge of said tool sleeve is annularly provided with an abutting protrusion, said end portion of said body being annularly provided with an abutting groove for retaining and positioning said abutting protrusion.

17. The anti-slip type electric drill chuck as claimed in claim 1, wherein said rear housing sleeve is internally provided with a projecting retaining portion, said first ring being provided with a groove for retaining said retaining portion.

* * * * *